United States Patent Office 3,657,183
Patented Apr. 18, 1972

---

3,657,183
STABILIZATION OF POLY(VINYL CHLORIDE)
Joseph Anthony Stretanski, Clinton, N.J., assignor to American Cyanamid Company, Stamford, Conn.
No Drawing. Continuation-in-part of application Ser. No. 477,321, Aug. 4, 1965. This application Apr. 24, 1969, Ser. No. 819,531
Int. Cl. C08f 45/60
U.S. Cl. 260—45.8 NZ
4 Claims

ABSTRACT OF THE DISCLOSURE

The stabilization of rigid poly(vinyl chloride) by incorporation therein of a stabilizer comprising (a) 0.1 to 10.0% based on the weight of the rigid poly(vinyl chloride) of an alkanolamine or a lower alkylene oxide adduct thereof and (b) 0.1 to 3.0% based on the weight of the rigid poly(vinyl chloride) of an ultraviolet light absorber. In the preferred embodiments, a heat stabilizer is also used.

---

This application is a continuation-in-part of application Ser. No. 477,321, filed Aug. 4, 1965, and now abandoned.

This invention relates to the stabilization of rigid poly (vinyl chloride) against degradation by light and, in the preferred embodiments, against degradation by heat also. It relates further to the resulting stabilized rigid poly(vinyl chloride).

For convenient, "poly(vinyl chloride)" will be referred to throughout the specification as "PVC." As used in this application, the expression "rigid" PVC is intended to mean a vinyl chloride polymeric composition having no plasticizer. "Rigid" PVC is to be distinguished from "flexible" PVC which is PVC containing a significant amount of plasticizer.

The sensitivity to light and heat of both flexible and rigid PVC compositions has been recognized and, to some extent, dealt with, by incorporating in the polymeric compositions to be stabilized, effective amounts of heat stabilizers and/or light stabilizers. Recently, the art of stabilizing PVC was advanced by the use, in combination, of members of a specific class of heat stabilizers and members of a specific class of light stabilizers. Thus, in U.S. Pat. 2,912,411, there is disclosed a means of stabilizing PVC compositions by the incorporation therein of a phosphoric amide (as a light stabilizer) and a conventional heat stabilizer (e.g., sodium carbonate, cadmium ricinoleate, or an organic epoxy hydrochlorophenyl). While there is no definite statement in this patent by which it is expressly limited to the stabilization of flexible PVC, it is noted that, in the examples of this patent, the PVC is in all cases plasticized with dioctyl phthalate. An attempt to stabilizer rigid PVC in accordance with this teaching leads to discouraging. Without any plasticizer, heat-stabilizer, rigid PVC responds only slight to the stabilizing effect of the phosphoric triamide. Thus, rigid PVC (i.e., PVC without plasticizer) is made only a bit more light stable as compared with PVC having only the heat stabilizer alone. The increase in stability is only slight and hardly makes the addition of the extra component worth the expense.

TABLE I.—RIGID PVC

| Additive Name | Conc. (weight percent) | U.V. exposure hours for ΔYI=15 |
|---|---|---|
| Control | | Degrades on mill. |
| Organo-tin-mecaptide (Thermolite 31)[1] | 2 | 130. |
| Organo-tin-mercaptide (Thermolite 31) and Hexamethylphosphoric triamide | 2<br>0.5 | }185. |

[1] A commercially available di-n-butyl tin bis(isooctyl mercapto acetate).

This particular light stabilizer, found to be very useful for plasticized PVC, is of only slight use in rigid PVC. In view of this finding, it is an object of the present-invention to provide a stabilizing combination which is capable of increasing the stability to light of rigid PVC. It is a further object to provide the stabilized rigid PVC composition obtained by using the stabilizer of this invention.

These and other objects are accomplished herein with great effectiveness and in a surprisingly simple manner. In accordance with the present invention, rigid PVC, which may contain a conventioal heat stabilizer, is made stable to light by the addition of a light stabilizer having the following two components:

(1) An ultrviolet absorber and
(2) An alkanolamine or alkylene oxide adduct thereof (hereinafter generically referred to as an "alkanolamine") of the following Formula I:

wherein Y is hydroxyalkyl; R is hydrogen or R[1]; R and R[1] can together form a heterocyclic ring; and R[1] is alkyl, hydroxyalkyl, aryloxyhydroxyalkyl, alkoxyhydroxyalkyl, partially esterified polyhydroxyalkyl and

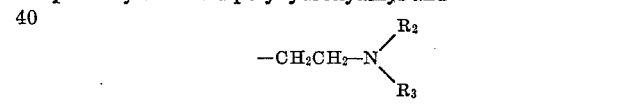

wherein R[2] is hydroxyalkyl and R[3] is hydroxyalkyl or

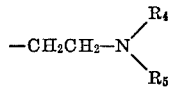

wherein R[4] and R[5] are hydroxyalkyl. The alkylene oxide adducts of the compounds of Formula I result from the reaction of an alkylene oxide such as ethylene oxide, propylene oxide, butylene oxide, etc., with a hydroxy (lower alkyl) group to produce an extended chain of the type

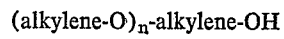

wherein n is an integer of 1 to 50 and "alkylene" is 2 to 7.

In the foregoing formulae, alkyl and alkoxy radicals when they occur may have 1–18 carbon atoms and aryl radicals may be of 1–2 six-membered rings, which may be substituted by alkyl and/or alkoxy of 1–18 carbons. Heterocyclic radicals which may be formed by R and R[1] have 5–6 members and are saturated. Typically, the term "hydroxyalkyl" comprehends di- and tri-hydroxyalkyl moieties. Ester moieties are formed from saturated aliphatic carboxylic acids of up to 18 carbon atoms especially the Cardura acids.

Typical examples of alkanolamines which have been found to be effective in the present invention are the following:

triethanolamine;
N-(2-hydroxydodecyl)diethanolamine;
N-(2-hydroxydodecyl)morpholine;
N-(2-hydroxydodecyl)-N-(1-methylheptyl)ethanolamine;
N,N,N',N'-tetrakis(2-hydroxypropyl)ethylenediamine;
N-(2-hydroxydodecyl)ethanolamine;
N-(2-hydroxydodecyl)-1,1-dimethylolethanolamine;
1,1',1'',1'''-[(2-hydroxypropyl)iminobis(ethylenenitrilo)]-tetra-2-propanol;
N-(3-dodecyloxy-2-hydroxypropyl)diethanolamine;
N-(2-hydroxy-3-lauryloxypropyl)ethanolamine;
2,2'-octadecyliminodiethanol;
N-[3-p-t-octylphenoxy)-2-hydroxypropyl]ethanolamine;
2-dodecylaminoethanol;
tetrahydroxyethylethylenediamine;

and the 3-ester of 2,3-dihydroxypropylaminoethanol where the esterifying agent is a mixture of α-branched carboxylic acid having 8 to 10 carbon atoms (i.e., Cardura acids).

The U.V. light absorbers which form the other component of the stabilizer of the present invention are well known. Generally such U.V. absorbers are of either the 2-hydroxybenzophenone, the 2-(2-hydroxyphenyl)-benzotriazole, the aromatic carboxylic ester, the tri(hydroxyaryl)triazine, the benzothiazole, the benzylidene-malonic ester, or the anilino methylene-malonitrile type. Others may be employed as long as they are compatible with PVC and have the effect of performing the normal U.V. absorber function.

Examples of ultraviolet absorbers which may be used are as follows:

(A) 2-hydroxybenzophenones:

2-hydroxy-4-methoxybenzophenone,
2,4-dihydroxybenzophenone,
2,2'-dihydroxy-4-methoxybenzophenone,
2,2',4,4'-tetrahydroxybenzophenone,
2,2'-dihydroxy-4,4'-dimethoxybenzophenone,
2-hydroxy-4-butoxybenzophenone,
2-hydroxy-4-octoxybenzophenone,
2-hydroxy-4-dodecyloxybenzophenone,
2,2'-dihydroxy-4-octoxybenzophenone,
4'-chloro-2-hydroxy-4-octoxybenzophenone, etc. This category of ultraviolet absorber is described in U.S. Patents 2,777,838 issued Jan. 15, 1957; 2,682,559 issued June 29, 1954; 2,693,492 issued Nov. 2, 1954; 2,861,053 issued Nov. 18, 1958; 2,919,259 issued Dec. 29, 1959; 2,976,259 issued Mar. 21, 1961; 3,006,959 issued Oct. 31, 1961; and 3,098,842 issued July 23, 1963.

(B) Benzotriazoles: Especially the 2-(2-hydroxyphenyl)benzotriazoles such as 2-(2-hydroxy-5-methylphenyl)benzotriazole,
2-(2-hydroxy-5-octylphenyl)benzotriazole,
2-(2-hydroxy-4-methoxyphenyl)benzotriazole,
2-(2-hydroxy-3-t-butyl-5-methylphenyl)benzotriazole,
2-(2-hydroxy-3,5-di-t-butylphenyl)benzotriazole,
2-(2-hydroxy-3,5-di-t-amylphenyl)benzotriazole,
2-(2-hydroxy-3,5-di-t-butylphenyl(-5-chlorobenzotriazole,
2-(2-hydroxy-3-t-butyl-5-methylphenyl)-5-chlorobenzotriazole, etc. This class of ultraviolet absorbers is described in U.S. Patents 3,004,896 issued Oct. 17, 1961; 3,018,269 issued Jan. 23, 1962; and 3,271,339 issued Sept. 6, 1966.

(C) Aromatic esters: Phenyl salicylate, tertiary-butylphenyl salicylate, phenyl resorcylate, p-octylphenyl benzoate, bis(p-nonylphenyl) isophthalate, bis(p-nonylphenyl) terephthalate, etc. Such aromatic esters are typically described in U.S. Patent 3,146,217 issued Aug. 25, 1964.

(D) Triazines: Especially triazines having at least one o-hydroxyphenyl substituent such as 2,4,6-tris(2-hydroxy-4-octyloxyphenyl)-s-triazine, 2-(2-hydroxy - 4 - octyloxyphenyl)-4,6-dixylyl-s-triazine, etc. Such triazines are described in U.S. Patents 3,118,887, issued Jan. 21, 1964; 3,293,247 and 3,293,249, both of which issued Dec. 20, 1966.

(E) Benzothiazoles and benzothiazolines:

2-anilinobenzothiazole,
2-(N-methylanilino)benzothiazole,
2-(4-methoxyanilino)benzothiazole,
2-(4-methoxyphenylimino)-3-ethylbenzothiazoline,
2-phenylimino-3-ethylbenzothiazoline and
2-(β-naphthylimino)benzothiazoline, etc. These materials are disclosed in U.S. Patent 2,393,801.

(F) Benzylidine - malonic esters: Diethyl p - methoxybenzylidenemalonate, diethyl o-methoxybenzylidenemalonate, diethyl p-hydroxybenzylidenemalonate, diethyl diphenylmethylenemalonate, etc. This specific class of ultraviolet absorbers is disclosed in copending application of Susi, Ser. No. 389,210 filed Aug. 12, 1964. Additional ultraviolet absorbers of the benzylidene type are also disclosed in U.S. Patent 3,244,668 issued Apr. 5, 1966.

(G) Arylaminoethylenes: Especially N-methyl-p-methoxyanilinomethylenemalonitriles such as diphenylaminomethylenemalononitrile and N-methyl-p-methoxyanilinomethylenemalononitrile. This class of ultraviolet absorbers is more fully disclosed in U.S. Patent 3,079,366 issued Feb. 26, 1963.

(H) Guanidines: Especially 1,2-dibenzoyl-3-arylguanidines such as 1,2-dibenzoyl-3-(p-methoxyphenyl)guanidine; 1,2 - dibenzoyl-3-(p-chlorophenyl)guanidine; 1,2-di-(p-methoxybenzoyl) - 3 - (p - methoxyphenyl)guanidine, etc. These ultraviolet absorbers are disclosed more fully in copending application Ser. No. 386,386 filed July 30, 1964.

(I) Cyanoacrylonitrile and cyanoacrylic acid derivatives: Especially aryl substituted compounds such as β-(diphenyl)-α-cyanoacrylic acid ethyl ester, β-(diphenyl)-α-cyanoacrylic acid octyl ester, α-phenylbenzylidene-malononitrile, diphenylbenzylidene - malononitrile, etc. This type of ultraviolet absorber is more fully disclosed in U.S. Patents 3,074,971 isued Jan. 22, 1963; 3,085,097 isued Apr. 9, 1963; 3,111,417 issued Nov. 19, 1963; 3,149,146 issued Sept. 15, 1964; 3,215,724 issued Nov. 2, 1965 and 3,278,448 issued Oct. 11, 1966.

Any ultraviolet absorber can be used for the purposes of the present invention so long as it performs the functions generally required of an ultraviolet light absorber. These functions are well-known to be absorbency in the region of about 300–400 millimicrons, low absorbency above about 400 millimicrons, solubility in and compatibility with polymers and stability to light and heat. This invention is not limited to the use of the above-named types and embraces the use of all types of ultraviolet absorbers.

The amount of ultraviolet absorber should be between 0.1 and 3.0%, preferably between 0.2 and 1.0%, based on the weight of the rigid PVC. The amount of alkanolamine used should be between 0.1 and 10.0%, preferably between 0.2 and 5%, based on the weight of the PVC.

It should be noted that the invention also contemplates, in its preferred embodiments, the stabilization of PVC against degradation by both heat and light such as might be encountered during normal usage of articles manufactured from PVC. Other heat stabilizers may be necessary to prevent PVC from being degraded by high temperatures required for milling, molding and compounding the PVC if such are utilized. The heat stabilizers which are useful for this purpose can be any of the conventionally available types. While rigid PVC is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaurate, dibutyl tin thioglycolic acid octyl ester, di-n-butyl tin bis(isooctyl mercapto acetate); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374.

When used with a heat stabilizer, the light stabilizer of the present invention may be added as a whole to the rigid PVC or the components may be added separately. Generally, the heat stabilizer is the first to be put into the PVC, and the light stabilizer components are then incorporated into this blend by conventional milling procedures. After thorough blending, the PVC can then be shaped into a film or other article of manufacture by compression-molding, extrusion, injection-molding, calendering, etc.

Other additives may be employed to modify the rigid PVC for the intended application. Among such additives are fillers, antistatic agents, pigments, dyes, etc.

The following examples, in which parts and percentages are on the basis of weight, are presented to further illustrate the present invention.

EXAMPLE I

Sample preparation

Except where indicated otherwise, samples were prepared by the following conventional procedure from the following masterbatch formulation:

| | Parts |
|---|---|
| Rigid poly(vinyl chloride) | 100 |
| Heat stabilizer | 2.0 |
| Stearic acid | 0.5 |

The samples were prepared by weighing the additives in 100 gram quantities of the masterbatch and roll-blending these samples overnight. The pre-blended masterbatch-additive mixture is placed on a roll mill and milled for five minutes at 165° C. The samples are fabricated by compression-molding at 175° C.

To determine the effectiveness of the various additives as light stabilizers, the samples were exposed in a FS–BL (Fluorescent Sunlamp-Blacklight exposure unit) and Sunshine Arc Weatherometer exposure unit. Yellow Index determinations were made with the use of a differential colorimeter. The FS-BL results are reported as the number of hours to reach a change of 15 Yellow Index units. The Weatherometer data is reported as the Yellow Index after X hours of exposure.

It is well known that the results of exposure tests in instruments such as the foregoing depend to some extent on uncontrolled environmental conditions. This makes the results of tests run at different times not strictly comparable. However, all samples exposed simultaneously are exposed to the same environmental conditions. Therefore, meaningful comparisons can be obtained from the results of groups of samples tested simultaneously. Thus, while results of tests made at different times should not be compared with each other, since different environmental conditions may have been present, it is standard practice to compare with each other the results of plural samples tested simultaneously. In accordance with this well established practice for conducting and interpreting exposure tests of this type, all samples in any single table of data reported in any subsequent example were exposed simultaneously. Thus, meaningful conclusions can be drawn from a comparison of all the data in any single table but data from one table should not be compared with data from other tables.

The additives used in the examples are the following:

U.V. absorbers

A=2-hydroxy-4-methoxybenzophenone
B=2-(2-hydroxy-5-methylphenyl)benzotriazole
C=(p-methoxybenzylidene)malonic acid, diethyl ester.

Alkanolamines

E=N-(2-hydroxydodecyl)-N-bisethanolamine
F=N-(2-hydroxydodecyl)morpholine
G=N-(2-hydroxydodecyl)-N-(1-methylheptyl) ethanolamine
H=N,N,N',N'-tetrakis(2-hydroxypropyl) ethylenediamine
I=N-(2-hydroxydodecyl)ethanolamine
J=N-(2-hydroxydodecyl)-N-(1,1-dimethylol)ethanolamine
K=1,1',1'',1'''-[(2-hydroxypropyl)iminobis(ethylenenitrilo)]tetra-2-propanol
L=tetrahydroxyethylethylene diamine
M=N-(3-dodecyloxy-2-hydroxypropyl)diethanolamine
N=(2-hydroxy-3-lauroxypropyl)ethanolamine $$\begin{array}{c} O=CH_3 \\ | \\ R-C-C-OCH_2CH-CH_2NHCH_2CH_2OH \\ | \ \| \ \ \ \ \ \ \ \ \ \ | \\ R' \ O \ \ \ \ \ \ \ \ \ \ \ OH \end{array}$$

where R and R'=6 to 8 carbon atoms.
P=2,2'-octadecyliminodiethanol
Q=N-[3-(p-t-octylphenoxy)-2-hydroxypropyl] ethanolamine
R=2-dodecylaminoethanol Heat stabilizers S=organo-tin-mercaptide sold under the trademark Thermolite 31
T=a sulfur-free complex organotin composition
U=a solid cadmium-barium organic complex soap Alkylene oxide adducts V=ethoxylated stearyl amine $$C_{18}H_{37}N\begin{array}{c}(CH_2CH_2O)_xH \\ \\ (CH_2CH_2O)_yH\end{array}$$

W=$C_{18-22}H_{37-45}NH(CH_2CH_2O)_{25}H$

TABLE I.—POLY(VINYL CHLORIDE) CONTAINING 2.0% S
[50 mil chips]

| | | FS-BL exposure data | | |
|---|---|---|---|---|
| Test No. | Other additives | Initial YI | Time (hrs.) for ΔYI=15 | Increase over control | Expected increase |
| 1 | None (control) | 2 | 130 | | |
| 2 | 0.5% A | 3 | 420 | 290 | |
| 3 | 0.5% E | 3 | 150 | 20 | |
| 4 | 0.5% H | 5 | 130 | 0 | |
| 5 | 0.5% A plus 0.5% E | 4 | 800 | 670 | 310 |
| 6 | 0.5% A plus 0.5% H | 6 | 820 | 690 | 290 |

These results show the virtual lack of effect when alkanolamines are used alone (Tests Nos. 3 and 4) and the mediocre activity when the U.V. absorber is used alone (Test No. 2). When the two classes of additives are used conjointly, the improvement in stabilizing effectiveness is easily noted.

TABLE IA.—POLY(VINYL CHLORIDE) CONTAINING 2.0% S
[50 mil chips]

| Test No. | Additive | Initial YI | Sunshine Arc Weatherometer data YI after exposure of— | | |
|---|---|---|---|---|---|
| | | | 100 hrs. | 200 hrs. | 300 hrs |
| 1 | None (control) | 2 | 17 | | |
| 2 | 0.5% A | 3 | 5 | 27 | |
| 3 | 0.5% A plus 0.5% E | 4 | 4 | 7 | 10 |
| 4 | 0.5% A plus 0.5% F | 5 | 4 | 9 | 14 |
| 5 | 0.5% A plus 0.5% G | 5 | 5 | 15 | 22 |
| 6 | 0.5% A plus 0.5% H | 6 | 5 | 8 | 11 |

The data in Table IA show the superiority of the combinations over the U.V. absorber alone. While YI is initially higher when additives are used than when they are not, after less then 100 hours of exposure, the YI of the control is far higher than the YI of the treated samples and the YI of the samples containing light stabilizing additives of this invention remains much lower than the sample having only an ultraviolet absorber.

EXAMPLE 2

More samples were prepared and tested by the procedure outlined in Example 1.

TABLE II.—POLY(VINYL CHLORIDE) CONTAINING 2.0% S
[50 mil chips]

| Test No. | Additive | Initial YI | FS-BL exposure data | | |
|---|---|---|---|---|---|
| | | | Time (hrs.) for $\Delta YI=15$ | Increase over control | Expected increase |
| 1 | None (control) | 2 | 130 | | |
| 2 | 0.5% C | 2 | 730 | 600 | |
| 3 | 0.5% E | 3 | 150 | 20 | |
| 4 | 0.5% C plus 0.5% E | 3 | 870 | 740 | 620 |

These data further show the superiority of the stabilizer combination of this invention over the individual additives using a different U.V. absorber.

EXAMPLE 3

Other PVC samples were prepared by the procedure of Example 1.

TABLE III.—POLY(VINYL CHLORIDE) CONTAINING 2.0% S
[50 mil chips]

| Test No. | Additive | Initial YI | FS-BL exposure data | | |
|---|---|---|---|---|---|
| | | | Time (hrs.) for $\Delta YI=15$ | Increase over control | Expected increase |
| 1 | None (control) | 2 | 130 | | |
| 2 | 0.5% B | 2 | 1,130 | 1,000 | |
| 3 | 0.5% E | 3 | 150 | 20 | |
| 4 | 0.5% H | 5 | 130 | 0 | |
| 5 | 0.5% B plus 0.5% E | 2 | 2,000 | 1,870 | 1,020 |
| 6 | 0.5% B plus 0.5% H | 4 | 1,810 | 1,680 | 1,000 |

These data also show the superiority of the combinations over the individual additives using another U.V. absorber.

EXAMPLE 4

Samples are prepared and tested by the procedure of Example 1 with the following results.

TABLE IV.—POLY(VINYL CHLORIDE) CONTAINING 2.0% S
[50 mil chips]

| Test No. | Additive | Initial YI | FS-BL exposure data | | |
|---|---|---|---|---|---|
| | | | Time (hrs.) for $\Delta YI=15$ | Increase over control | Expected increase |
| 1 | None (control) | 2 | 130 | | |
| 2 | 0.5% A | 3 | 720 | 590 | |
| 3 | 0.5% I | 16 | 170 | 40 | |
| 4 | 0.5% A plus 0.5% I | 10 | 1,650 | 1,520 | 630 |

These results again show the superiority of the light stabilizing combinations of this invention over the individual additives using other alkanolamines.

EXAMPLE 5

Other samples were prepared and tested by the procedure of Example 1.

TABLE V.—POLY(VINYL CHLORIDE) CONTAINING 2.0% S
[50 mil chips]

| Test No. | Additive | Initial YI | FS-BL exposure data | |
|---|---|---|---|---|
| | | | Time (hrs.) for $\Delta YI=15$ | Increase over control |
| 1 | None (control) | 2 | 130 | |
| 2 | 0.5% A | 3 | 720 | 590 |
| 3 | 0.5% A plus 0.5% J | 11 | 1,320 | 1,190 |
| 4 | 0.5% A plus 0.5% K | 10 | 1,510 | 1,380 |
| 5 | 0.5% A plus 0.5% M | 6 | 1,440 | 1,310 |

These results show the superiority of the combinations of this invention over the U.V. absorber alone. The increase in exposure time for a change in Yellow Index of 15 units was not obtained for the alkanolamines alone, but such increases would not amount to more than 50 hours, the usual increase shown for this type of additive alone.

EXAMPLE 6

Other samples were prepared and tested by the proceduce of Example 1.

TABLE VI.—POLY(VINYL CHLORIDE) CONTAINING 2.0% S
[50 mil chips]

| Test No. | Additive | Initial YI | FS-BL exposure data | |
|---|---|---|---|---|
| | | | Time (hrs.) for $\Delta YI=15$ | Increase over contro |
| 1 | None (control) | 2 | 130 | |
| 2 | 0.5% A | 3 | 610 | 480 |
| 3 | 0.5% A plus 0.5% L | 11 | 1,210 | 1,080 |

These results again show the superiority of the stabilizing combinations of this invention over the U.V. absorber alone using another of the alkanolamines.

EXAMPLE 7

Other samples were prepared and tested by the procedure of Example 1.

TABLE VII.—POLY(VINYL CHLORIDE) CONTAINING 2.0% S
[50 mil chips]

| Test No. | Additive | Initial YI | FS-BL exposure data | | |
|---|---|---|---|---|---|
| | | | Time (hrs.) for $\Delta YI=15$ | Increase over control | Expected increase |
| 1 | None (control) | 2 | 130 | | |
| 2 | 0.5% A | 3 | 430 | 300 | |
| 3 | 0.5% P | 5 | 140 | 10 | |
| 4 | 0.5% E | 3 | 150 | 20 | |
| 5 | 0.5% A plus 0.5% P | 5 | 660 | 530 | 103 |
| 6 | 0.5% A plus 1.0% P | 6 | 960 | 830 | |
| 7 | 0.5% A plus 0.5% E | 3 | 800 | 670 | 320 |
| 8 | 0.5% A plus 1.0% E | 5 | 1,070 | 940 | |
| 9 | 0.5% A plus 2.0% E | 7 | (¹) | >1,200 | |

¹ $\Delta YI=9$ at 1,330.

These results again show the superiority of the combinations over the individual additives and show that an increase in concentration of alkanolamine produces still further superiority.

EXAMPLE 8

Other samples were prepared and tested by the procedure of Example 1.

TABLE VIII.—POLY(VINYL CHLORIDE) CONTAINING 2.0% S

[50 mil chips]

| Test No. | Additive | FS-BL exposure data | | |
|---|---|---|---|---|
| | | Initial YI | Time (hrs.) for ΔYI=15 | Increase over control |
| 1 | None (control) | 2 | 130 | |
| 2 | 0.5% A | 3 | 430 | 300 |
| 3 | 0.5% A plus 0.5% N | 13 | 730 | 600 |
| 4 | 0.5% A plus 0.5% O | 7 | 810 | 680 |
| 5 | 0.5% A plus 0.5% Q | 9 | 570 | 440 |
| 6 | 0.5% A plus 0.5% R | 21 | 1,050 | 920 |

These results show the superiority of the combinations of this invention over the U.V. absorber alone using various alkanolamines.

EXAMPLE 9

Other samples were prepared and tested by the procedure of Example 1.

TABLE IX.—HEAT STABILIZED (2.0% ADDITIVE U) PVC

[50 mil chips]

| Test No. | Additive | FS-BL exposure data | | |
|---|---|---|---|---|
| | | Initial YI | Time (hrs.) for ΔYI=15 | Increase over control |
| 1 | None (control) | 7 | 50 | |
| 2 | 0.5% A | 8 | 870 | 820 |
| 3 | 0.5% B | 7 | 860 | 810 |
| 4 | 0.5% C | 7 | 480 | 430 |
| 5 | 0.5% A plus 0.5% E | 9 | 1,050 | 1,000 |
| 6 | 0.5% B plus 0.5% E | 10 | 1,070 | 1,020 |
| 7 | 0.5% C plus 0.5% E | 10 | 620 | 570 |

Among other things, the results show that the increased effectiveness of the U.V. absorbers resulting from the addition of alkanolamines is evidenced in the presence of various heat stabilizers.

The samples employed in the this experiment were prepared as given in the section on sample preparation except that the masterbatch had the following composition:

| | Parts |
|---|---|
| Geon 103 EP[1] | 100 |
| Additive U | 3.0 |
| Stearic acid | 0.5 |

[1] A commercially available rigid poly(vinyl chloride).

EXAMPLE 10

Other samples were prepared and tested by the procedure of Example 1.

TABLE X.—PVC CONTAINING 1.0% ADDITIVE S AND 2.0% ADDITIVE T

[50 mil chips]

| Test No. | Additive | FS-BL exposure data | | |
|---|---|---|---|---|
| | | Initial YI | Time (hrs.) for ΔYI=15 | Increase over control |
| 1 | None (control) | 4 | 140 | |
| 2 | 0.5% A | 4 | 1,560 | 1,420 |
| 3 | 0.5% B | 4 | 1,760 | 1,620 |
| 4 | 0.5% C | 4 | 1,190 | 1,050 |
| 5 | 0.5% A plus 0.5% E | 10 | 1,930 | 1,790 |
| 6 | 0.5% B plus 0.5% E | 10 | 2,420 | 2,280 |
| 7 | 0.5% C plus 0.5% E | 8 | 1,420 | 1,280 |

These data show the superiority of the combinations over the U.V. absorber alone and the effectiveness of the combination in the presence of a plurality of heat stabilizers.

The samples employed in this experiment were prepared as in Example 1 except that the masterbatch had the following composition:

| | Parts |
|---|---|
| PVC | 100 |
| Additive S | 1.0 |
| Additive T | 2.0 |
| Stearic acid | 0.5 |

EXAMPLE 11

Other samples were tested and prepared by the procedure of Example 1.

TABLE XI.—PVC CONTAINING 2.0% ADDITIVES

| Test No. | Additive | FS-BL exposure data | |
|---|---|---|---|
| | | Initial YI | Time (hrs.) for ΔYI=15 |
| 1 | Control | 3 | 560 |
| 2 | 0.5% A | | |
| 3 | 0.5% A plus 0.5% V | 12 | (¹) |
| 4 | 0.5% A plus 0.5% W | 5 | 1,140 |

¹ ΔYI=11 at 1,140.

EXAMPLE 12

Five PVC films were prepared without any heat stabilizer present. On film was utilized as a control and had no additive present. A second film contained 1.0% of Additive M [N-(3-dodecyloxy-2-hydroxypropyl)diethanolamine]. The third and fourth films contained 0.5% and 1.0%, respectively, of Additive A (2-hydroxy-4-methoxybenzophenone). The fifth film ( in accordance with the present invention) contained 0.5% of Additive M plus 0.5% of Additive A. Each film was compression molded directly from the homopolymer powder (after dry blending a portion of the powder with the appropriate additive or additives where used. The five films were then exposed to ultraviolet light using a Fluorescent Sunlamp-Blacklight (FS-BL) lamp for 75 hours and the change in yellow index was measured using a differential colorimeter ("Colormaster") as in Example 1. The results are shown below in Table XII.

TABLE XII

| Description | Initial YI | ΔYI on exposure for 75 hours |
|---|---|---|
| Control—no additive | 4+ | 36 |
| PVC plus 1.0% additive M | 2 | 21 |
| PVC plus 0.5% additive A | 4 | 15 |
| PVC plus 1.0% additive A | 4 | 6+ |
| PVC plus 0.5% additive M plus 0.5% additive A | 3 | 0.6 |

This example shows that, in the absence of a heat stabilizer, the alkanolamine alone produced slight light stabilizing effect but that, when used in combination with an ultra-violet light absorber the greatly enhanced light stabilizing effect of the present invention was obtained.

In total, these examples clearly demonstrate the beneficial light stabilizing effect of the stabilizer combinations of the present invention in rigid PVC in the presence of and in the absence of heat stabilizers.

I claim:

1. Rigid poly(vinyl chloride) stabilized against the deteriorating effects of light by having incorporated therein:
   (a) N-(2-hydroxy-dodecyl)morpholine; and
   (b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat; said N-(2-hydroxy-dodecyl)morpholine being present in a concentration of 0.1 to 10.0% based on the weight of the rigid poly(vinyl chloride), and said ultraviolet absorber being present in a concentration of 0.1 to 3.0% based on the weight of the rigid poly(vinyl chloride).

2. Rigid poly(vinyl chloride) stabilized against the deteriorating effects of light by having incorporated therein:
   (a) N,N,N',N'-tetrakis(2 - hydroxypropyl)ethylene-diamine; and
   (b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat; said N,N,N',N'-tetrakis(2-hydroxypropyl)ethylene diamine being present in a concentration of 0.1 to 10.0% based on the weight of the rigid poly(vinyl chloride), and said ultraviolet absorber being present in a concentration of 0.1 to 3.0% based on the weight of the rigid poly(vinyl chloride).

3. Rigid poly(vinyl chloride) stabilized against the deteriorating effects of light by having incorporated therein:
   (a) 1,1',1'',1'''-[(2-hydroxypropyl)iminobis(ethylenenitrilo)]-tetra-2-propanol, and
   (b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat; said 1,1',1'',1'''-[(2-hydroxypropyl)iminobis(ethylenenitrilo)]-tetra-2-propanol being present in a concentration of 0.1 to 10.0% based on the weight of the rigid poly(vinyl chloride), and said ultraviolet absorber being present in a concentration of 0.1 to 3.0% based on the weight of the rigid poly(vinyl chloride).

4. Rigid poly(vinyl chloride) stabilized against the deteriorating effects of light by having incoporated therein:
   (a) N-(3-dodecyloxy-2-hydroxypropyl)diethanolamine; and
   (b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat; said N-(3-dodecyloxy-2-hydroxypropyl)diethanolamine being present in a concentration of 0.1 to 10.0% based on the weight of the rigid poly(vinyl chloride), and said ultraviolet absorber being present in a concentration of 0.1 to 3.0% based on the weight of the rigid poly(vinyl chloride).

References Cited
UNITED STATES PATENTS

| | | | |
|---|---|---|---|
| 2,031,941 | 9/1935 | Young et al. | 260—45.9 |
| 2,919,259 | 12/1959 | Naylor et al. | 260—45.95 |
| 3,079,366 | 2/1963 | Boyle et al. | 260—45.9 |
| 3,118,887 | 1/1964 | Hardy et al. | 260—45.8 X |
| 3,214,436 | 10/1965 | Boyle et al. | 260—48.5 X |
| 3,244,668 | 4/1966 | Knapp et al. | 260—45.85 |

OTHER REFERENCES

Chevassus et al.: The Stabilization of Polyvinyl Chloride, St. Martin's Press, Inc., N.Y. 1963, pp. 165–169, and 306.

DONALD E. CZAJA, Primary Examiner

M. J. WELSH, Assistant Examiner

U.S. Cl. X.R.

260—23 XA, 45.75 K, 45.8 N, 45.9 R

Case 23,069

UNITED STATES PATENT OFFICE
CERTIFICATE OF CORRECTION

Patent No. 3,657,183　　　　Dated April 18, 1972

Inventor(s) Joseph Anthony Stretanski

It is certified that error appears in the above-identified patent and that said Letters Patent are hereby corrected as shown below:

Col. 1, line 31:  "convenient" should read -- convenience --.

Col. 1, line 50:  "hydrochlorophenyl" should read -- hydrochlorophyl --.

Col. 1, line 55:  "stabilizer" should read -- stabilize --.

Col. 1, line 56:  After "discouraging" insert -- results --.

Col. 1, lines 56-57:  "stabilizer" should read -- stabilized --.

Col. 1, line 57:  "slight" should read -- slightly --.

Col. 2, line 15:  "present-invention" should read -- present invention --.

Col. 2, line 24:  "conventioal" should read -- conventional --.

Col. 2, line 28:  "ultrviolet" should read -- ultraviolet --.

Col. 3, line 65:  "2-(2-hydroxy-3,5-di-t-butylphenyl(" should read -- 2-(2-hydroxy-3,5-di-t-butylphenyl) --.

Col. 4, line 46:  "isued" (both occurrences) should read -- issued --.

Col. 8, line 39, Table VI, last column: "contro" should read -- control --.

Col. 8, line 62, Table VII, last column "103" should read -- 310 --.

UNITED STATES PATENT OFFICE
CERTIFICATE OF CORRECTION (CONT'D)

Patent No. 3,657,183    Dated April 18, 1972

Inventor(s) Joseph Anthony Stretanski

It is certified that error appears in the above-identified patent and that said Letters Patent are hereby corrected as shown below:

Col. 9, line 38: "in the this" should read -- in this --.

Col. 10, Table XI, lines 9&10, Test Nos. 1 and 2, last two columns should read

-- 3     130
   3     560 --

Signed and sealed this 1st day of August 1972.

(SEAL)
Attest:

EDWARD M. FLETCHER, JR.            ROBERT GOTTSCHALK
Attesting Officer                  Commissioner of Patents